(12) United States Patent
Avinash et al.

(10) Patent No.: US 7,623,728 B2
(45) Date of Patent: Nov. 24, 2009

(54) METHOD AND PRODUCT FOR PROCESSING DIGITAL IMAGES

(75) Inventors: Gopal B. Avinash, New Berlin, WI (US); Rakesh Mohan Lal, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 976 days.

(21) Appl. No.: 10/708,771

(22) Filed: Mar. 24, 2004

(65) Prior Publication Data
US 2005/0213845 A1 Sep. 29, 2005

(51) Int. Cl.
*G06K 9/34* (2006.01)
*G06K 9/40* (2006.01)

(52) U.S. Cl. .............. 382/275; 382/133; 382/173; 382/260; 382/270

(58) Field of Classification Search ............. 382/275, 382/173
See application file for complete search history.

(56) References Cited

U.S. PATENT DOCUMENTS

| | | | | |
|---|---|---|---|---|
| 4,951,140 A * | 8/1990 | Ueno et al. | ............. | 348/413.1 |
| 5,157,740 A | 10/1992 | Klein et al. | .................... | 382/51 |
| 5,268,967 A * | 12/1993 | Jang et al. | .................... | 382/132 |
| 5,368,033 A | 11/1994 | Moshfeghi | ............... | 128/653.4 |
| 5,631,975 A * | 5/1997 | Riglet et al. | ................ | 382/173 |
| 5,694,478 A * | 12/1997 | Braier et al. | ................ | 382/133 |
| 5,825,910 A | 10/1998 | Vafai | ......................... | 382/132 |
| 5,915,044 A * | 6/1999 | Gardos et al. | ............... | 382/236 |
| 6,061,476 A * | 5/2000 | Nichani | ....................... | 382/270 |
| 6,081,626 A * | 6/2000 | Bruegmann et al. | ........ | 382/260 |
| 6,088,392 A * | 7/2000 | Rosenberg | ............. | 375/240.03 |
| 6,173,083 B1 * | 1/2001 | Avinash | ...................... | 382/260 |
| 6,240,215 B1 | 5/2001 | Salgado et al. | .............. | 382/254 |
| 6,243,070 B1 * | 6/2001 | Hill et al. | ..................... | 345/589 |
| 6,275,304 B1 * | 8/2001 | Eschbach et al. | ............ | 358/1.9 |
| 6,337,925 B1 | 1/2002 | Cohen et al. | ................ | 382/199 |
| 6,453,069 B1 * | 9/2002 | Matsugu et al. | ............. | 382/173 |
| 6,507,618 B1 * | 1/2003 | Wee et al. | ............. | 375/240.16 |
| 6,580,812 B1 * | 6/2003 | Harrington | .................. | 382/107 |
| 6,661,918 B1 * | 12/2003 | Gordon et al. | ............. | 382/173 |
| 7,391,895 B2 * | 6/2008 | Wang et al. | ................. | 382/132 |
| 2001/0055421 A1 * | 12/2001 | Baatz et al. | ................. | 382/173 |
| 2002/0037103 A1 * | 3/2002 | Hong et al. | ................. | 382/173 |
| 2003/0044045 A1 * | 3/2003 | Schoepflin et al. | ......... | 382/103 |
| 2003/0152285 A1 * | 8/2003 | Feldmann et al. | ........... | 382/274 |
| 2005/0055658 A1 * | 3/2005 | Mukherjee et al. | ........... | 716/19 |

OTHER PUBLICATIONS

Canny, John. "A Computational Approach to Edge Detection". *IEEE: Transactions on Pattern Analysis and Machine Intelligence.* vol. PAMI-8, No. 6, Nov. 1986. IEEE: 1986.

* cited by examiner

*Primary Examiner*—Bhavesh M Mehta
*Assistant Examiner*—Michael Vanchy, Jr.
(74) *Attorney, Agent, or Firm*—Cantor Colburn LLP

(57) ABSTRACT

A method and computer program product for processing a digital image is disclosed. A foreground region relating to an imaged object is estimated, a background region relating to other than the imaged object is estimated, and by using the image, the estimated foreground region and the estimated background region, a transition region disposed between the foreground region and the background region is calculated. The estimated foreground region, the estimated background region, and the calculated transition region, each include a separate set of pixels that may each be processed separately for suppressing pixel intensities in the estimated background region and improving image quality.

21 Claims, 5 Drawing Sheets

METHOD AND PRODUCT FOR PROCESSING DIGITAL IMAGES

BACKGROUND OF INVENTION

The present disclosure relates generally to a method and product for processing digital images, and particularly to a method and product for processing digital images with detection and suppression of background noise.

A digital image is a collection of digital information in the form of pixels that may be processed to provide a visual image representative of an object-of-interest. The digital image may be obtained from digital cameras, digital video, digital scanners, or the like, or may be digitized from an analog film. An exemplary object-of-interest is a biological object, and an exemplary digital scanner is a magnetic resonance imaging (MRI) scanner. While reference may be made herein to MRI as an exemplary scanning method, it will be appreciated that other scanning methods may be employed, such as computed tomography (CT), ultrasound, or X-ray, for example. Digital images of objects that are smaller than the field of view of the scan contain background regions where the signal intensity should be zero. However, variations in the intensities of these background pixels may arise due to noise and other artifacts such as ghosting and gradient warping correction for example. Though noise may be prominent throughout an image, it is most prominent in the background regions where the signal is expected to be zero. The presence of background intensity in an image unnecessarily distracts an observer who may be viewing the final image. Accordingly, there is a need in the art for a digital image processing method and product that improves image quality by detecting and suppressing background noise.

SUMMARY OF INVENTION

Embodiments of the invention include a method for processing a digital image. A foreground region relating to an imaged object is estimated, a background region relating to other than the imaged object is estimated, and by using the image, the estimated foreground region and the estimated background region, a transition region disposed between the foreground region and the background region is calculated. The estimated foreground region, the estimated background region, and the calculated transition region, each include a separate set of pixels that may each be processed separately for suppressing pixel intensities in the estimated background region and improving image quality.

Other embodiments of the invention include a computer program product for processing a digital image, the product including a storage medium, readable by a processing circuit, storing instructions for execution by the processing circuit for performing embodiments of the aforementioned method.

BRIEF DESCRIPTION OF DRAWINGS

Referring to the exemplary drawings wherein like elements are numbered alike in the accompanying Figures.

DETAILED DESCRIPTION

Embodiments of the invention provide a method and product for processing digital images, and particularly to a method and product for processing digital images with detection and suppression of background noise. In an exemplary embodiment, a biological object is scanned using an MRI imaging technique, and the resulting image is digitally processed for the detection of background noise and suppression thereof, thereby improving the signal-to-noise-ratio (SNR) of the resulting image. The digital image is separated into foreground, background and transition regions, thereby enabling each region to be analyzed and processed separately. The processing techniques applied involve low-level image processing techniques, such as thresholding and binary image subtraction for example. While embodiments described herein may employ MRI as an exemplary imaging technique, it will be appreciated that the disclosed invention may also employ other imaging techniques, such as CT, Ultrasound, X-ray, and the like, for example.

Figure 1:
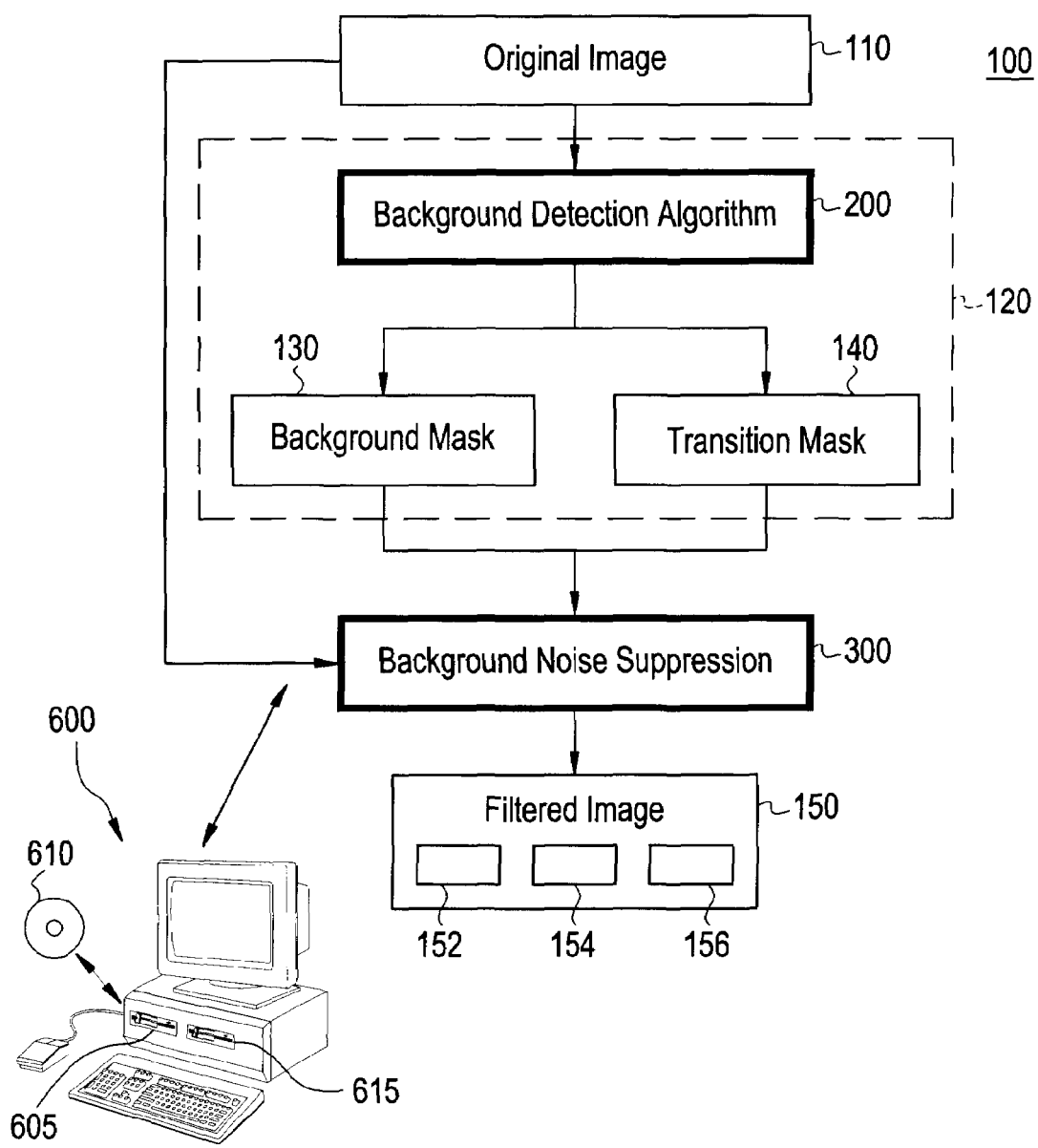
FIG. 1 depicts an exemplary method and system for processing digital images in accordance with embodiments of the invention.

Referring now to FIG. 1, a high-level flowchart of an exemplary method 100 for processing a digital image is depicted. An original image 110 is analyzed and segmented at block 120 into foreground, background and transition regions, with the background region being referred to as a background mask 130, and the foreground and transition regions being incorporated into and referred to as a transition mask 140. A background detection method 200, discussed hereinafter in reference to FIG. 2, segments original image 110 into the three aforementioned regions. While reference is made herein to an "original" image 110, it will be appreciated that this reference is merely a reference to the image entering analysis block 120, and does not infer a "first occurrence" of image 110. For example, it is contemplated that original image 110 may be a digital representation of an analog film resulting from an imaging technique, such as X-ray for example. Here, the analog film would be considered the "first occurrence" image, and the digital representation would be considered the original image 110 entering analysis block 120.

Information from original image 110, background mask 130 and transition mask 140, is used by a background noise suppression method 300, discussed hereinafter in reference to FIG. 3, for suppressing the background noise and improving the SNR of the resulting image. The resulting image is then filtered to produce a filtered image 150. While embodiments described herein disclose the suppression of background noise, it will be appreciated that such suppression may generally be described as the suppression of pixel intensities in the background region.

Figure 2:
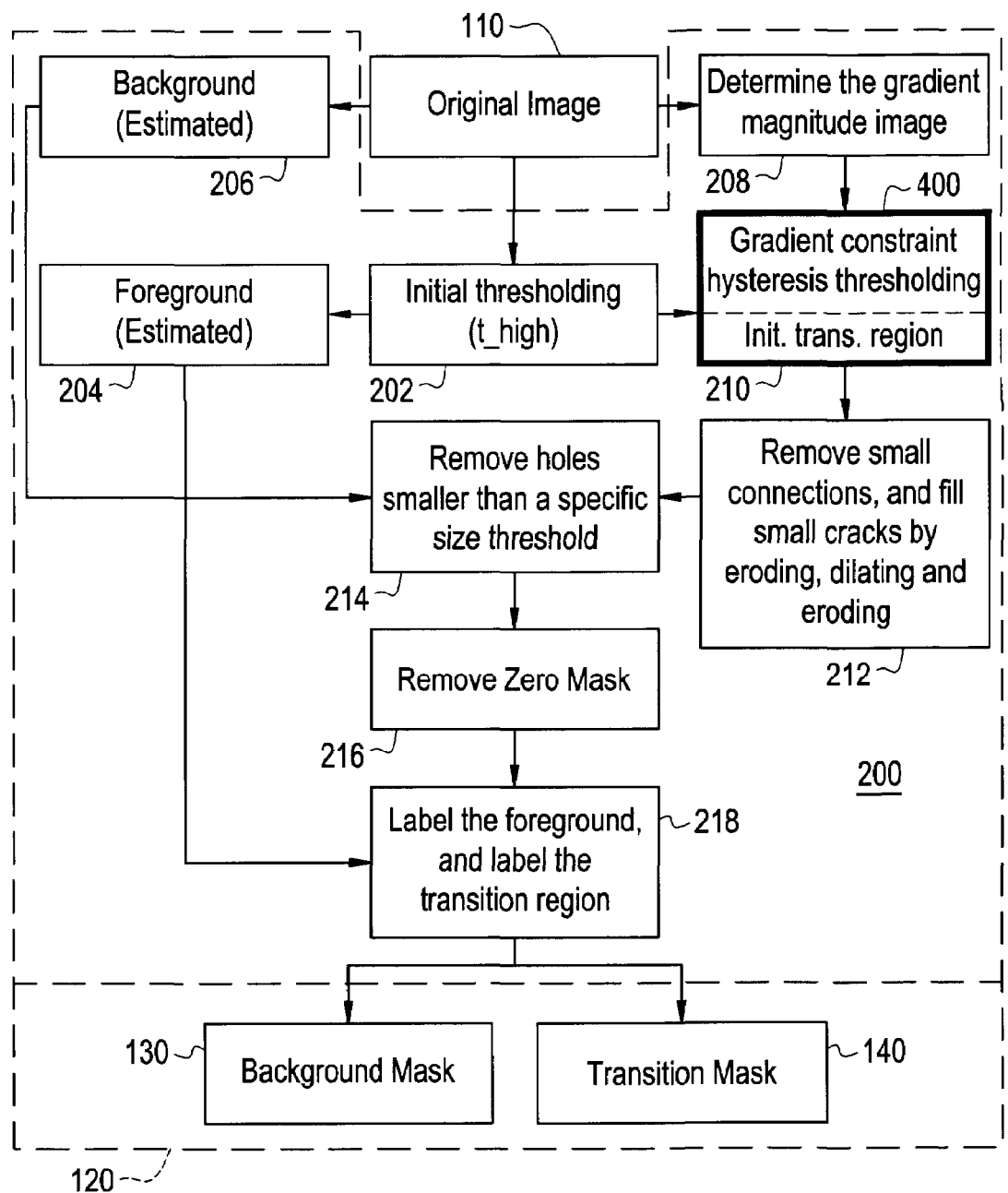
FIG. 2 depicts further detail of the method of FIG. 1.

Background detection method 200 will now be discussed with reference to FIGS. 2-4. From original image 110, a foreground region relating to the imaged biological object is estimated 202 by applying a pixel intensity threshold t_high 402 to filter out all but those pixels having an intensity equal to or greater than t_high 402, where such filtering may alternatively be viewed as filtering original image 110 according to a first criterion. In an exemplary embodiment, the value of t_high 402 is set to be about 50% of the mean intensity of the non-zero pixels in original image 110. The resulting region is referred to as the estimated foreground region 204, also referred to as the initial foreground region. Also from original image 110, a background region relating to other than the imaged object is estimated as containing all pixels in original image 110 having an intensity of zero. The resulting region is referred to as the estimated background region 206, which is also referred to as the zero mask. Alternatively, the estimated background region 206 may be defined as that region containing those pixels of the image meeting a second criterion, such as an intensity of zero, or an intensity less than a low intensity threshold, for example.

From original image 110, a gradient magnitude image 208 is computed that provides a value for the gradient of the intensity of each pixel of original image 110. A gradient-constrained-hysteresis-threshold (GCHT) method 400 is applied to original image 110 using gradient magnitude image 208 to calculate an initial transition region 210. Initial transition region 210 is disposed between estimated foreground and background regions 204, 206, which may be seen by referring to the illustration depicted FIG. 5.

Figure 3:
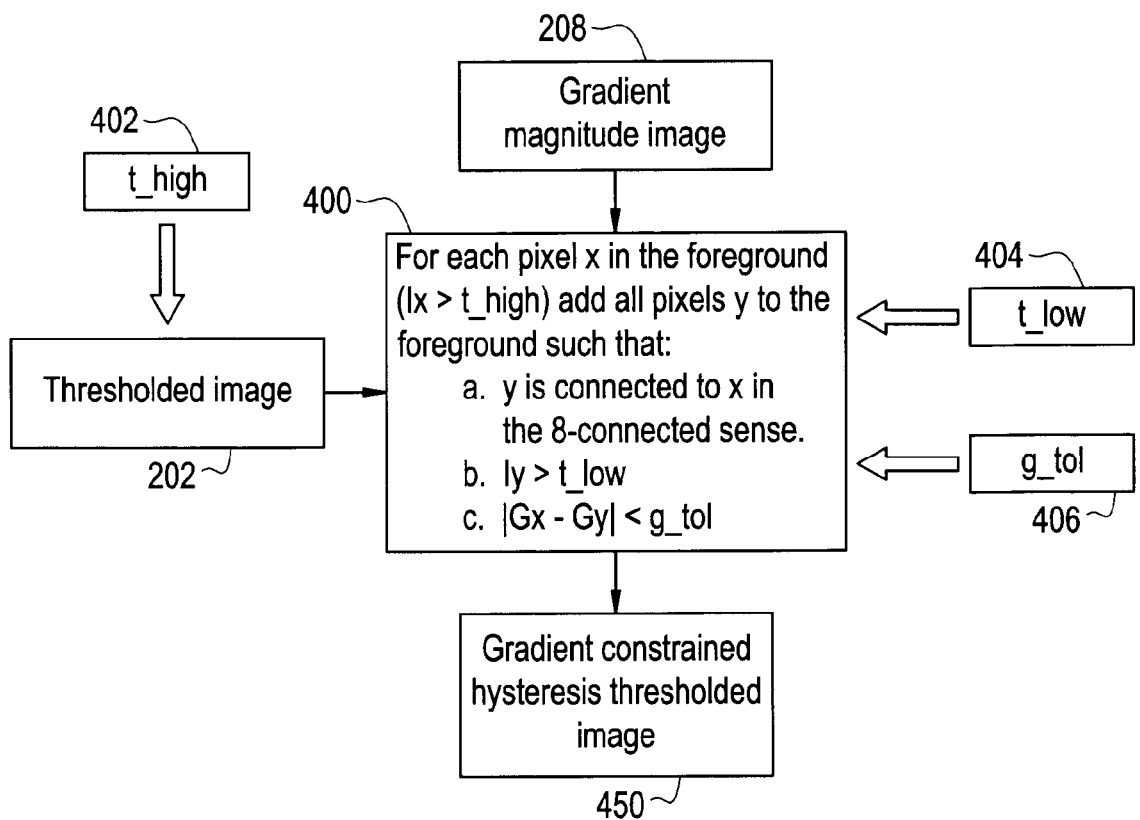
FIG. 3 depicts further detail of the method of FIG. 2.
Figure 4:
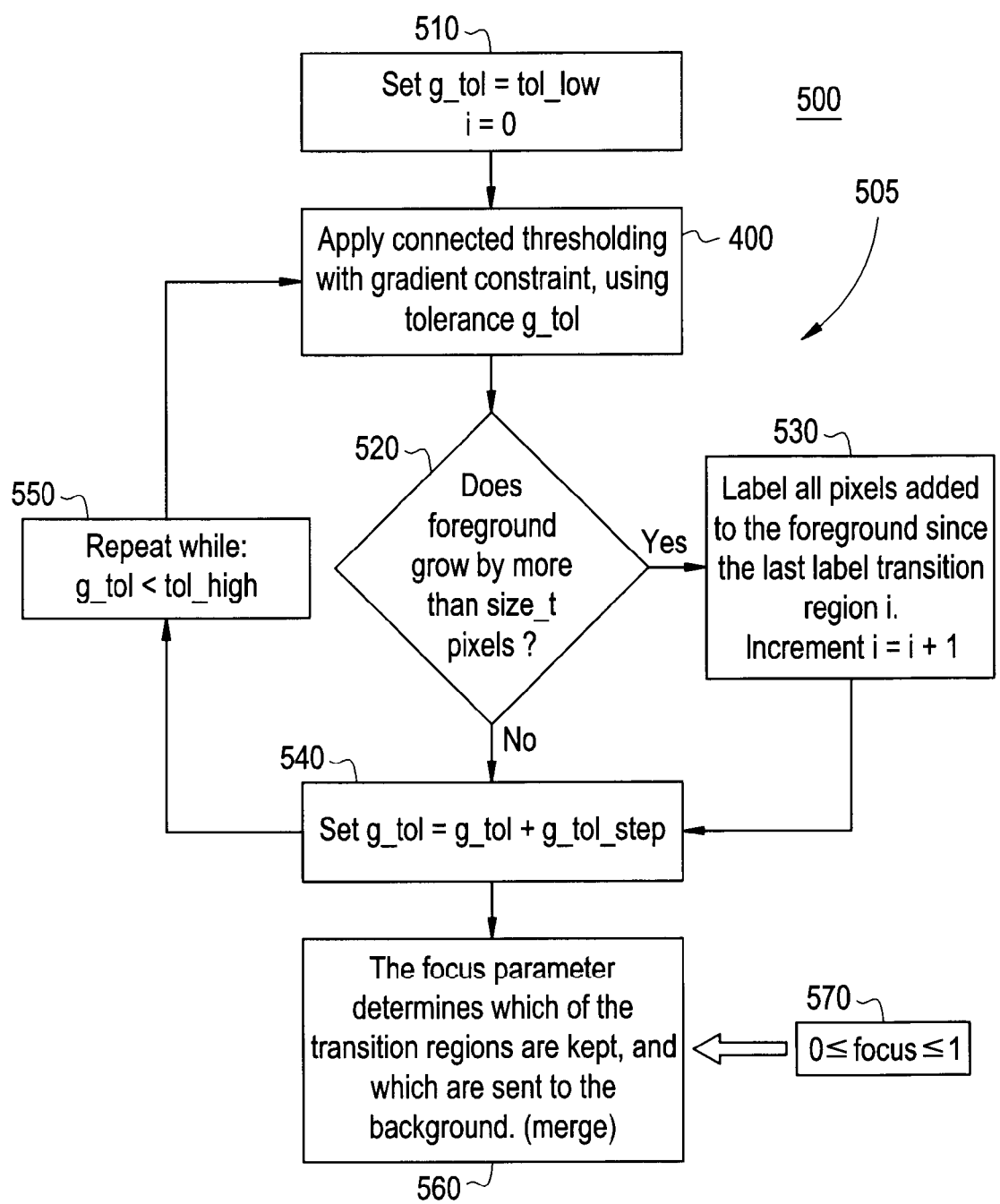
FIG. 4 depicts an alternative method to that depicted in FIG. 3.

In an embodiment, initial transition region 210 is calculated to be that region containing pixels having a morphological connection (that is, a connection made possible via a morphological operation) to a pixel of estimated foreground region 204, having an intensity greater than a low threshold t_low 404, and having a gradient magnitude that is within a gradient tolerance value g_tol 406 of the gradient magnitude of the foreground pixel to which it is connected, which is depicted in algorithm form in FIGS. 3 and 4. Generally, however, initial transition region 210 may be considered to be that region of the image containing those pixels that meet a transition region criterion, such as the set of aforementioned criteria, for example.

Referring to FIG. 3, the application of GCHT method 400 with hysteresis thresholding and gradient constraining is depicted in the absence of an iterative approach. Here, the inputs to GCHT method 400 are gradient magnitude image 208 and estimated foreground region 204, where estimated foreground region 204 has been estimated using intensity threshold t_high 402. The output of GCHT method 400 is a gradient constrained hysteresis threshold image 450. For each pixel x in the foreground (estimated foreground region 204 for example) where the pixel intensity Ix is greater than t_high 402, initial transition region 210 is calculated to be that region defined by the set of pixels y where:

y is connected to x in an 8-connected sense (that is, in a 3-by-3 matrix of 9 pixels, the center pixel is considered to be connected to each of the 8 pixels on the perimeter);

the intensity Iy of y pixel is greater than low threshold t_low 404; and the absolute value of the difference between the gradient magnitude of x pixel and the gradient magnitude of y pixel (|Gx-Gy|) is less than a defined gradient tolerance value g_tol 406.

In GCHT 400, the values for low threshold t_low 404 and gradient tolerance value g_tol 406 may be user adjusted, thereby making GCHT method 400 tunable.

Estimated foreground region 204, estimated background region 206, and calculated initial transition region 210, each comprise a separate set of pixels that may each be processed separately for suppressing background noise and improving image quality. For example, and as suggested by GCHT method 400 depicted in FIG. 3, the y pixels of initial transition region 210 may be added to the x pixels of estimated foreground region 204, thereby growing the foreground region that is representative of the biological object being imaged for greater object renditioning. Here, and in the absence of an iterative approach, initial transition region 210 becomes transition mask 140.

An advantage associated with GCHT method 400 is that in an image having strong edges, the growing region grows along the edge and not across the edge. In this way, moderate intensity background artifacts that are connected to an edge will not get incorporated into the transition region. As a result, the t_low threshold 404 may be set quite low to capture low intensity foreground regions into the transition region without incorporating artifacts with higher intensities that are in the background. Also, this approach will capture the low intensity foreground regions in images that suffer from intensity variation as long as the image gradient in the regions of intensity variation is less than the gradient tolerance value g_tol.

Referring to FIG. 4, GCHT method 400 is modified to include an iterative approach, thereby resulting in an iterative GCHT method 500. Here, GCHT method 400 is shown as one operation in an iterative do-loop 505.

At the beginning of the iterative process, the gradient tolerance value g_tol 406 is set 510 to a low gradient tolerance value tol_low 408, after which, GCHT method 400 is applied as discussed previously. Next, at 520, it is determined whether the foreground-plus-transition-region (for example, estimated foreground region 204 plus initial transition region 210 for the first pass in the iterative process) has grown by more than a defined number of pixels size_t. In response to the determination at 520 being yes, all pixels that may be added to the foreground since the last labeling are labeled as incremental transition region "i", and the iteration counter is incremented by one (i=i+1). These actions are depicted at 530. In response to the determination at 520 being no, gradient tolerance value g_tol 406 is incremented by a gradient tolerance value step g_tol_step 410 until a high gradient tolerance value tol_high 412 condition is met or exceeded. These actions are depicted at 540 and 550, respectively, where 550 is labeled "repeat while: g_tol<tol_high". With each iteration of do-loop 505, incremental transitions regions (i, i+1, i+2, etc.) are calculated, with each incremental transition region having an incrementally larger gradient tolerance value g_tol 406 that has a value between tol_low 408 and tol_high 412. The iterative do-loop 505 is continued until tol_high 412 is met or exceeded.

In an embodiment employing the iterative method of FIG. 4, each incremental transition region (i, i+1, i+2, etc.) 530 is calculated to be that region containing pixels connected to a pixel of a previously calculated incremental transition region 530, having an intensity greater than a low threshold t_low 404, and having a gradient magnitude that is within the incrementally larger gradient tolerance value (g_tol+g_tol_step) of the gradient magnitude of the incremental transition region pixel to which it is connected.

Upon completion of do-loop 505, that is, where the condition "repeat while:g_tol<tol_high" 550 is no longer satisfied, all of the incremental transition regions (i, i+1, i+2, etc.) 530 are merged into a single transition region 560 using a focus parameter 570. In an embodiment, the focus parameter 570 is the percentage of the total number of transition regions that will be kept as transition mask 140. For example, where there are ten transition regions (i=1 through 10) and the focus parameter 570 is set to 80% (focus=0.8), then the first eight transitions regions (i=1 through 8) will be merged into transition mask 140 and the last two transition regions will be discarded. Accordingly, and in the presence of an iterative approach, the adjustment of single transition region 560 by focus parameter 570 results in transition mask 140. An advantage of using a focus parameter is that the internal parameters of method 100 may be fixed and the entire process may be made controllable or tunable by the single focus parameter 570. The higher the focus parameter 570, the more liberal method 100 is in accepting pixels into transition mask 140.

In an embodiment, the following parameters may be tunable:
  intensity high threshold t_high 402
  intensity low threshold t_low 404
  gradient tolerance value g_tol 406
  low gradient tolerance value tol_low 408
  gradient tolerance value step g_tol_step 410
  high gradient tolerance value tol_high 412

However, some of these parameters may set to a defined value. For example, low gradient tolerance value tol_low 408 and high gradient tolerance value tol_high 412 may be set to a specific percentage of the average gradient magnitude of the entire original image 110, and gradient tolerance value step g_tol_step 410 may be set according to a desired number of iterations, such as (tol_high-tol_low)/10 where ten iterations are desired for generating ten incremental transition regions 530, for example.

Once transition mask 140 is defined, an object region, also referred to as the object image, may be defined as being the union of the estimated foreground region 204 and the transition mask 140, which may then undergo morphological operations for improving the image quality. Here, the term object region refers to those pixels of the original image that are determined via method 100 to be representative of the biological object under observation. Such morphological operations may include erosion of the image and dilation back to the transition mask to remove small objects and bridges that may connect background noise to the main object, and dilation of the image and erosion back to the original size to fill small cracks in the edges of the image 212. The zero mask may then be combined with the object image, which may then undergo a connected-components morphological operation to fill small holes in the resulting image 214. Upon completion of the hole filling process 214, the zero mask is removed from the image resulting in the final object mask 216. The final object mask 216 is then separated into a final foreground region and a final transition region 218. In accordance with embodiments of the invention disclosed herein, the initial estimated foreground region 204 is labeled the final foreground mask 152, the difference between the object region and the final foreground mask is labeled the final transition mask 154, and the remainder of the image is labeled the final background mask 156, which collectively make up the filtered image 150, best seen by referring back to FIG. 1. By separating the image into different regions, each region may be treated differently to improve image quality. For example, the intensities of the foreground pixels may be increased slightly to improve contrast and increase SNR in the foreground regions, while the intensities of the background pixels are lowered to reduce noise in the background regions. The final object image is the union of the final foreground mask 152 and the final transition mask 154 after filtering.

Figure 5:
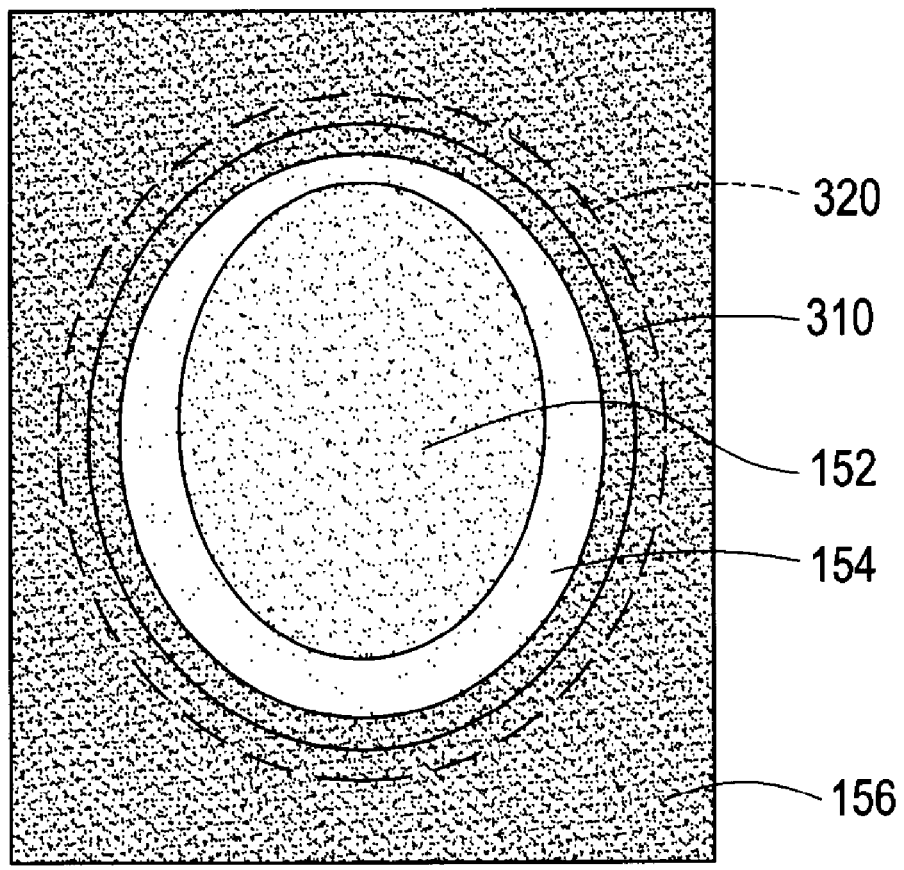
FIG. 5 depicts yet further detail of the method of FIG. 1.

Regarding the suppression of background noise, and referring now to FIG. 5, the background noise may be suppressed gradually by reducing the intensity of the background pixels to zero as a function of their distance from the final object image. In FIG. 5, final foreground mask 152, final transition mask 154, and final background mask 156, are depicted. Shown at increasing distances from final transition mask 154 are two regions 310, 320, which extend into the background region defined by final background mask 156. In accordance with embodiments of the invention, the background noise in regions 310, 320 is suppressed gradually by reducing the intensity of the background pixels in those regions to zero the further the region is from final transition mask 154. Different functions may be employed to gradually reduce the intensity of the background pixels to zero, such as a Gaussian function, a Hanning function, a Hamming function, or any function suitable for reducing a pixel intensity value with respect to distance from a defined origin. Combinations of functions may be employed as desired. Alternatively, all background pixel intensities may be identically set to zero, or the background region may be homogenized by iteratively blurring the background region and adding a small fraction of the original image back into the background region.

Embodiments of the invention may be provided in executable instruction form on a storage medium, such as memory 605 or in the form of a hard drive, a floppy disk or a CD-ROM 610 for example, that is readable by a processing circuit, such as processor 615 for example, the processing circuit being in signal communication via application software with a graphical user interface at a computer, such as computer 600 for example, whereby a user may execute the embedded instructions for practicing the disclosed invention. The instructions may be loaded into and/or executed by computer 600, or transmitted over some transmission medium, such as over electrical wiring or cabling, through fiber optics, or via electromagnetic radiation, wherein when the computer program code is loaded into and executed by computer 600, the computer becomes an apparatus for practicing the invention. When implemented on a general-purpose microprocessor, the computer program code segments configure the microprocessor to create specific logic circuits. The technical effect of the executable instructions is to enhance the quality of a digital image, of a scanned biological object for example, by detecting and suppressing background noise in the image.

As disclosed, some embodiments of the invention may include some of the following advantages: use of low level image processing tools (no statistical models, no neural network based methods, for example) for improving image quality; use of method parameters that may be tunable or predefined; the ability to capture low intensity foreground regions into the transition mask without incorporating artifacts with higher intensities that are in the background; and, the ability to execute morphological and filtering operations on discrete regions of the image thereby providing greater control over the generation and quality of the final object image.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method for processing a digital image, the method comprising:

acquiring a digital first image of a biological object;

estimating a foreground region from the first image relating to the biological object, wherein the estimating of a foreground region includes defining an initial foreground region as that region containing those pixels of the first image meeting a first criterion;

estimating a background region from the first image relating to other than the biological object, wherein the estimating a background region includes defining the background region as that region containing those pixels of the first image meeting a second criterion; and by using the first image, the estimated foreground region and the estimated background region, calculating a transition region disposed between the foreground region and the background region by a gradient constrained hysteresis threshold method, wherein pixels of the transition region meet a third criterion;

wherein the estimated foreground region, the estimated background region, and the calculated transition region, each comprise a separate set of pixels that may each be processed separately for suppressing pixel intensities in the estimated background region and improving image quality;

iteratively calculating incremental transition regions, each having an incrementally larger gradient tolerance value, until a gradient tolerance value threshold is met or exceeded, wherein:

each incremental transition region is calculated to be that region containing pixels connected to a pixel of a previously calculated incremental transition region, having an intensity greater than the second threshold, and having a gradient magnitude that is within the incrementally larger gradient tolerance value of the gradient magnitude of the incremental transition region pixel to which it is connected; and, generating a second image of the biological object when the gradient tolerance value threshold is met or exceeded.

2. The method of claim 1, wherein the calculating a transition region further comprises:

using a focus parameter to merge a defined number of the initial plus incremental transition regions into a single transition region.

3. The method of claim 2, further comprising:

defining an object region as the union of the initial foreground region and the single transition region, and performing at least one morphological operation on the object region.

4. The method of claim 3, further comprising:

defining a final foreground mask as the initial foreground region;

defining a final transition mask as the difference between the object region and the final foreground region; and defining a final background mask as the remainder of the first image.

5. The method of claim 2, further comprising:

suppressing pixel intensities in the background region by gradually reducing the intensity of background pixels to zero as a function of their distance from the object region.

6. The method of claim 5, wherein the function comprises a linear ramp function, an exponential function, a Gaussian function, a Hanning function, a Hamming function, any function for reducing a value with respect to distance, or any combination of functions comprising at least one of the foregoing functions.

7. A program storage medium, readable by a computer, storing a program of instructions executable by the computer to perform a method for processing a digital image, comprising:

estimating a foreground region relating to an imaged object;

estimating a background region relating to other than the imaged object; and by using the image, the estimated foreground region and the estimated background region, calculating a transition region disposed between the foreground region and the background region;

wherein the estimated foreground region, the estimated background region, and the calculated transition region, each comprise a separate set of pixels that may each be processed separately for suppressing pixel intensities in the estimated background region and improving image quality;

wherein the calculating a transition region further includes iteratively calculating incremental transition regions, each having an incrementally larger gradient tolerance value, until a gradient tolerance value threshold is met or exceeded;

wherein each incremental transition region is calculated to be that region containing pixels connected to a pixel of a previously calculated incremental transition region, having an intensity greater than the second threshold, and having a gradient magnitude that is within the incrementally larger gradient tolerance value of the gradient magnitude of the incremental transition region pixel to which it is connected.

8. The program storage medium of claim 7, wherein:

the estimating a foreground region comprises defining an initial foreground region as that region containing those pixels of the image meeting a first criterion; and the estimating a background region comprises defining the background region as that region containing those pixels of the image meeting a second criterion; and, the transition region is calculated by a gradient constrained hysteresis threshold method.

9. The program storage medium of claim 8, wherein the first criterion comprises a pixel intensity greater than a first threshold.

10. The program storage medium of claim 8, wherein the second criterion comprises a pixel intensity less than a second threshold.

11. The program storage medium of claim 10, wherein the calculating a transition region comprises calculating the transition region as that region containing those pixels of the image meeting a third criterion.

12. The program storage medium of claim 11, wherein the third criterion comprises:

a pixel having a pixel intensity greater than the second threshold, a morphological connection to a foreground pixel, and a gradient magnitude that is within a gradient tolerance value of the gradient magnitude of the foreground pixel.

13. The program storage medium of claim 12, further comprising instructions for execution by the processing circuit for:

defining an object region as the union of the initial foreground region and the initial transition region, and performing at least one morphological operation on the object region.

14. The program storage medium of claim 13, further comprising instructions for execution by the processing circuit for:

defining a final foreground mask as the initial foreground region;

defining a final transition mask as the difference between the object region and the final foreground region; and defining a final background mask as the remainder of the image.

15. The program storage medium of claim 14, further comprising instructions for execution by the processing circuit for:

suppressing pixel intensities in the background region by gradually reducing the intensity of background pixels to zero as a function of their distance from the object region.

16. The program storage medium of claim 15, wherein the function comprises a linear ramp function, an exponential function, a Gaussian function, a Hanning function, a Hamming function, any function for reducing a value with respect to distance, or any combination of functions comprising at least one of the foregoing functions.

17. The program storage medium of claim 12, wherein the calculating a transition region further comprises:

using a focus parameter to merge a defined number of the initial plus incremental transition regions into a single transition region.

18. The program storage medium of claim 7, wherein the digital image is a digital image of a biological object obtained using MR imaging, CT imaging, Ultrasound imaging, X-ray imaging, or any combination comprising at least one of the foregoing imaging processes.

19. A method for processing a digital image, the method comprising:

acquiring a digital first image of a biological object;

estimating a foreground region from the first image relating to the biological object as a region containing those pixels of the first image that have an intensity greater than a first threshold;

estimating a background region from the first image relating to other than the biological object as a region containing those pixels of the first image that have and intensity less than a second threshold;

by using the first image, the estimated foreground region and the estimated background region, calculating an initial transition region by a gradient constrained hysteresis threshold method, said initial transition region being disposed between the foreground region and the background region;

defining a plurality of incremental transition regions from the initial transition region, wherein each of the plurality of incremental transition regions each have an incrementally larger gradient tolerance value;

wherein the estimated foreground region, the estimated background region, and the calculated transition region, each comprise a separate set of pixels that may each be processed separately and independently of each other for suppressing pixel intensities in the estimated background region and improving image quality to generate a second image of the biological object.

20. The method of claim 19, wherein:

the first threshold is a percentage of the mean intensity of the non-zero pixels in the first image.

21. The method of claim 20 wherein:

the inputs to said gradient constrained hysteresis threshold method is a gradient magnitude image and said estimated foreground region.

\* \* \* \* \*

UNITED STATES PATENT AND TRADEMARK OFFICE
CERTIFICATE OF CORRECTION

PATENT NO. : 7,623,728 B2 Page 1 of 1
APPLICATION NO. : 10/708771
DATED : November 24, 2009
INVENTOR(S) : Avinash et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1645 days.

Signed and Sealed this

Twenty-sixth Day of October, 2010

David J. Kappos
*Director of the United States Patent and Trademark Office*